United States Patent
Yadav (10) Patent No.: US 8,611,337 B2
(45) Date of Patent: Dec. 17, 2013

(54) ADAPTIVE SUBSCRIBER BUFFERING POLICY WITH PERSISTENT DELAY DETECTION FOR LIVE AUDIO STREAMS

(75) Inventor: Pankaj Yadav, Haryana (IN)

(73) Assignee: Adobe Systems Incorporated, San Jose, CA (US)

( * ) Notice: Subject to any disclaimer, the term of this patent is extended or adjusted under 35 U.S.C. 154(b) by 1135 days.

(21) Appl. No.: 12/416,045

(22) Filed: Mar. 31, 2009

(65) Prior Publication Data

US 2013/0163579 A1 Jun. 27, 2013

(51) Int. Cl.
*H04L 12/28* (2006.01)
*H04J 3/06* (2006.01)

(52) U.S. Cl.
USPC .............................. 370/352; 370/412; 370/516

(58) Field of Classification Search
USPC ........... 370/476–519, 229–428; 709/215–229
See application file for complete search history.

(56) References Cited

U.S. PATENT DOCUMENTS

| | | | |
|---|---|---|---|
| 5,623,483 A * | 4/1997 | Agrawal et al. ............... | 370/253 |
| 5,825,771 A | 10/1998 | Cohen et al. | |
| 5,835,579 A | 11/1998 | Gersi et al. | |
| 6,243,398 B1 | 6/2001 | Kahane et al. | |
| 6,259,538 B1 | 7/2001 | Amit et al. | |
| 6,332,153 B1 | 12/2001 | Cohen | |
| 6,389,032 B1 | 5/2002 | Cohen | |
| 6,445,681 B1 | 9/2002 | Pogrebinsky | |
| 6,452,950 B1 * | 9/2002 | Ohlsson et al. ............... | 370/516 |
| 6,603,759 B1 * | 8/2003 | Moskal et al. ................ | 370/352 |
| 6,661,793 B1 | 12/2003 | Pogrebinsky | |
| 6,683,889 B1 * | 1/2004 | Shaffer et al. ................. | 370/516 |
| 6,711,158 B1 | 3/2004 | Kahane et al. | |
| 6,714,519 B2 | 3/2004 | Luzzatti et al. | |
| 6,862,298 B1 * | 3/2005 | Smith et al. ................... | 370/516 |
| 6,912,224 B1 * | 6/2005 | Duault et al. ................. | 370/412 |
| 7,009,988 B2 * | 3/2006 | Han et al. ...................... | 370/412 |
| 7,120,169 B2 * | 10/2006 | Wolf et al. ..................... | 370/503 |
| 7,142,506 B1 | 11/2006 | Pogrebinsky | |
| 7,359,324 B1 * | 4/2008 | Ouellette et al. .............. | 370/230 |
| 7,424,026 B2 * | 9/2008 | Mallila ........................ | 370/413 |
| 7,457,282 B2 * | 11/2008 | Mallila ........................ | 370/352 |
| 7,573,894 B2 * | 8/2009 | Schulz et al. ................. | 370/412 |
| 7,680,099 B2 * | 3/2010 | Lakaniemi ..................... | 370/352 |

(Continued)

FOREIGN PATENT DOCUMENTS

| | | |
|---|---|---|
| EP | 1128610 | 8/2001 |
| WO | WO2008/067388 | 6/2008 |

OTHER PUBLICATIONS

RTMP Specification License for and description of Real Time Messaging Protocol Chunk Stream, Adobe Systems Incorporated, 2003-2009, 70 pages.

(Continued)

*Primary Examiner* — M. Phan
(74) *Attorney, Agent, or Firm* — Wolfe-SBMC (57) ABSTRACT

Methods, systems, and apparatus, including computer programs encoded on computer storage media, for an adaptive subscriber buffering policy with persistent delay detection for live audio streams. In one aspect, a method includes decoding frames of multimedia data received from a first network; storing the decoded frames of multimedia data in a buffer; monitoring the buffer to determine a level of delay; and providing an output, based on the monitoring of the buffer, to cause a reduction in the level of delay during retrieval and encoding of the stored frames of multimedia data.

18 Claims, 6 Drawing Sheets

(56) References Cited

U.S. PATENT DOCUMENTS

| | | | |
|---|---|---|---|
| 7,830,900 B2* | 11/2010 | Black et al. | 370/412 |
| 7,936,672 B2* | 5/2011 | Skerritt | 370/232 |
| 8,094,552 B1* | 1/2012 | Sachidanandam | 370/230 |
| 8,254,376 B2* | 8/2012 | Mahkonen | 370/352 |
| 2005/0180443 A1 | 8/2005 | Schulz et al. | |
| 2006/0050743 A1* | 3/2006 | Black et al. | 370/516 |
| 2006/0092918 A1* | 5/2006 | Talalai | 370/352 |
| 2006/0109789 A1 | 5/2006 | Skerritt | |
| 2009/0316580 A1* | 12/2009 | Pang et al. | 370/235 |

OTHER PUBLICATIONS

Stone, Donald L. et al., "Queue Monitoring: A Delay Jitter Management Policy", 1993, Network and Operating System Support for Digital Audio and Video, Proceedings, Fourth Intl. Workshop, Lancaster, UK, 12 pages.

\* cited by examiner

ADAPTIVE SUBSCRIBER BUFFERING POLICY WITH PERSISTENT DELAY DETECTION FOR LIVE AUDIO STREAMS

TECHNICAL FIELD

The present disclosure relates to managing the delay between retrieving and processing digital audio data by utilizing an adaptive buffering policy.

BACKGROUND

Voice over Internet Protocol ("VoIP") is a transmission technology for delivering voice communication data over a broadband network, e.g., the Internet, instead of a regular, e.g., analog, phone line. Audio codecs within VoIP systems convert voice information into digital audio signals that can be transmitted over an IP network. VoIP enables users to make calls from a data processing apparatus, a special VoIP phone, or a traditional phone connected to a special adapter. VoIP systems can interface with public switched telephone lines to enable worldwide communication.

VoIP systems utilize data buffers when transmitting digital audio signals over IP networks. Data buffers implemented in software can be used to temporarily hold data to account for differences between the rate at which data is received and the rate at which data is processed. When the data buffer reaches a predefined threshold of stored data, audio playback of the stored data can commence. A small buffer can provide nearly instantaneous playback, but is vulnerable to adverse network channel conditions. A wider buffer can provide higher resilience to bandwidth and latency fluctuations occurring on the network, but can require a longer buffering time before audio playback.

SUMMARY

This specification describes technologies relating to an adaptive subscriber buffering policy with persistent delay detection for live audio streams. In general, frames of multimedia data can be transmitted over a first network to a gateway device. The multimedia data can include voice information encoded into digital audio signals. The first network can be an IP network configured to deliver the digital audio signals in a VoIP system. The frames of multimedia data can be transmitted as a real-time audio stream. The frames of multimedia data can be decoded at the gateway device. The decoded frames of multimedia data can be stored at a buffer. The buffer can be monitored to determine a level of delay during the processing of the stored frames of multimedia data. The processing can include the retrieval and encoding of the stored frames of multimedia data. Based on the monitoring of the buffer, an output can be provided to cause a reduction in the level of delay during the processing of the stored frames of multimedia data. The monitoring of the buffer can occur over a configurable time interval. During the configurable time interval, a minimum length of data in the buffer can be determined. Thus, the amount of multimedia data in the buffer can be monitored over the configurable time interval to determine the minimum length of data in the buffer. When the minimum length of the multimedia data in the buffer is less than a configurable threshold length of data in the buffer, the stored frames of multimedia data can be retrieved and encoded to generate packets of multimedia data. However, when the minimum length of the multimedia data in the buffer exceeds the configurable threshold length of data in the buffer, then a level of persistent delay is determined to be present in the processing of the stored frames of multimedia data and an indication of the level of persistent delay can be provided. To reduce the level of persistent delay at the buffer, the gateway device can be implemented to re-sample the stored frames of multimedia data during the encoding process. The re-sampled frames of multimedia data also can be encoded to generate packets of multimedia data. The packets of multimedia data can be transmitted over a second network configured to deliver digital audio signals in a VoIP system.

One innovative aspect of the subject matter described in this specification can be implemented in methods that include the actions of decoding frames of multimedia data received from a first network. Storing the decoded frames of multimedia data in a buffer. Monitoring the buffer to determine a level of delay. Providing an output, based on the monitoring of the buffer, to cause a reduction in the level of delay during retrieval and encoding of the stored frames of multimedia data. Other implementations of this aspect include corresponding systems, apparatus, and computer programs, configured to perform the actions of the methods, encoded on computer storage devices.

These and other implementations can each optionally include one or more of the following features. The monitoring of the buffer can occur over a configurable time interval. A minimum length of the buffer can be determined during the configurable time interval. An indication of the level of delay, based on a difference between the determined minimum length and a threshold length can be provided. The reduction in the level of delay can include re-sampling the stored frames of multimedia data during the encoding. The encoding can be performed to generate packets of multimedia data. The packets can be transmitted over a second network. The frames of multimedia data can be transmitted using transmission control protocol (TCP). The packets can be transmitted using user datagram protocol (UDP).

Particular implementations of the subject matter described in this specification can be implemented to realize one or more of the following advantages. The buffer can be constantly monitored over a configurable time interval to determine the level of persistent delay in the processing of frames of multimedia data. Based on the monitoring, an output can be provided to cause a reduction in the level of persistent delay at the buffer. Reducing the level of persistent delay can result in a small buffer at a gateway device. The level of persistent delay can be determined by taking the difference between a determined minimum length of data in the buffer and a threshold length of data in the buffer. Rather than monotonically increasing the level of delay during a phone conversation, the adaptive buffering policy presents a mechanism to reduce the level of delay. The level of persistent delay can be reduced by re-sampling the frames of multimedia data stored at the buffer.

User experiences with VoIP systems can be enhanced with the adaptive buffering policy because no relevant data, i.e., words, need be completely lost or dropped during transmission. Re-sampling the frames of multimedia data enables relevant portions of the data to be retained such that the underlying voice information remains comprehensible. The level of persistent delay also can be reduced by dropping frames of multimedia data that do not contain audible voice information, i.e., silent periods during a phone conversation. By reducing the level of persistent delay in the buffer, the digital audio signals can be transmitted faster and the voice information can be received with improved fluidity.

The adaptive buffering policy also can detect when a publisher transmits a greater amount of data than expected. Upon detecting more data than expected, the adaptive buffering policy can initiate external catch-up logic to reduce the level of persistent delay. Moreover, the adaptive buffering policy can continue to process the frames of multimedia data even when the minimum length of data in the buffer exceeds the threshold length of data in the buffer. The adaptive buffering policy can result in low latency VoIP phone conversations. Furthermore, the adaptive buffering policy requires only minimum computer processing in the buffer management scheme to determine the minimum buffer length during a particular window of time.

Details of one or more implementations of the subject matter described in this specification are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
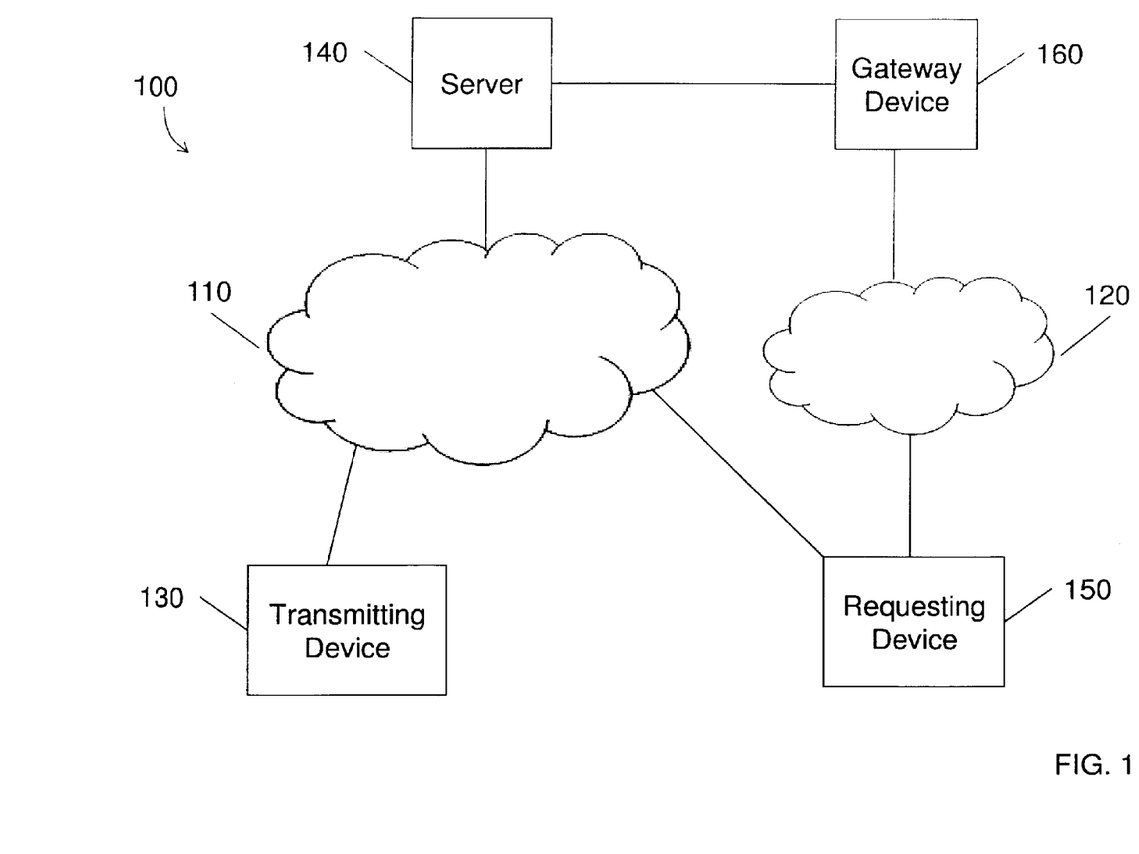
FIG. 1 shows an example of a communication system configured to deliver digital audio signals in a VoIP system.

FIG. 1 shows an example of a communication system 100 configured to deliver digital audio signals in a VoIP system. The communication system 100 can include multiple networks and multiple network nodes. The communication system 100 can be implemented as a VoIP system to deliver voice communication data encoded into digital audio signals over an IP network. The communication system 100 also can be implemented to deliver multimedia data, including video content, audio content, or both, over the IP-based network. The multimedia data can be transmitted over the networks in encoded units of data, such as in frames, packets, or datagrams. The multimedia data can be transmitted as a real-time audio stream. In some implementations, the multimedia data can be converted from one unit of data to another during transmission over the networks. Nodes on the network can selectively transmit, store, request, serve, buffer and receive data.

Nodes of network 110 can be implemented to transmit data using the transmission control protocol ("TCP"). TCP is a Transport Layer of the Internet Protocol Suite that operates at a higher level than the IP, the primary protocol in the Internet Layer of the Internet Protocol Suite. TCP generally provides ordered and reliable delivery of a stream of data from one computer program to another. Jointly, TCP and IP can provide a reliable service that can notify the transmitting computer program if delivery of the multimedia data fails. The multimedia data can be segmented into frames and transmitted using TCP. Collectively, several frames of multimedia data can represent an audio or video clip. The multimedia data also can be formatted into packets and transmitted using the TCP. Packets can be transmitted over any IP-based network, regardless if the service is reliable.

Nodes of network 120 can be implemented to transmit data using the user datagram protocol ("UDP"). UDP is also a Transport Layer of the Internet Protocol. UDP generally does not provide ordered and reliable delivery of a stream of data from one computer program to another. Data transmitted over UDP can arrive out of order, appear duplicated, or disappear without notice. Jointly, UDP and IP provide an unreliable service that will not notify the transmitting computer program if delivery of the multimedia data fails. The multimedia data can be formatted into packets, i.e., datagrams, and transmitted using UDP.

The transmitting device 130 can transmit data over the network 110. The transmitting device 130 can be implemented in hardware and configured to operate a software program. For example, the transmitting device 130 can be implemented in hardware and programmed to transmit frames of multimedia data over the network 110. In some implementations, the transmitting device 130 can be any application, module or device, implemented in software that can transmit frames of multimedia data over the network 110. In some implementations, the transmitting device 130 can be a media player, such as Flash Player® by Adobe Systems Incorporated of San Jose, Calif. The transmitting device 130 can transmit recorded content stored in a local storage device or local memory cache. The transmitting device 130 also can stream live data as the live data is being captured. For example, voice information, such as a phone conversation, encoded into digital audio signals can be transmitted as a real-time audio stream. The transmitting device 130 can communicate with a server 140 over the network 110.

The server 140 can receive data transmitted over the network 110. The server 140 can communicate with the transmitting device 130 and can receive frames of multimedia data over the network 110. The server 140 can store the frames of multimedia data in a local storage device or local memory cache. The server 140 can be implemented in hardware and configured to operate a software program. For example, the server 140 can be implemented in hardware and programmed to run a server program. In some implementations, the server 140 can be any application, module or device, implemented in software that can provide services to other computer programs. In some implementations, the server 140 can be media server, such as Flash Media Server® by Adobe Systems Incorporated of San Jose, Calif. The server 140 can transmit the stored frames of multimedia data over the network 110. The server 140 also can stream live data over the network 110. For example, the server 140 can transmit the voice information encoded into digital audio signals as a real-time audio stream over the network 110. The server 140 also can communicate with a requesting device 150 over the network 110.

The requesting device 150 can transmit a request for data over the networks 110 and 120. The requesting device 150 also can be implemented to receive data over the networks 110 and 120. The request for data can be transmitted to the server 140. The requesting device 150 can transmit a request for the frames of multimedia data stored at the server 140. The requesting device 150 also can transmit a request to the server 140 for a stream of live data. The requesting device 150 also can transmit requests for live or stored data to a gateway device 160. The requesting device 150 can be implemented in hardware and configured to operate a software program. For example, the requesting device 130 can be implemented in hardware and programmed to transmit requests and receive data over a network. In some implementations, the requesting device 150 can be any application, module or device, implemented in software that can transmit requests and receive data over a network. The requesting device 150 can receive the frames of multimedia data from the server 140 over the network 110. The requesting device 150 also can receive packets of multimedia data from the gateway device 160 over the network 120.

The gateway device 160 can receive data, store data, process data and transmit data over the network 120. The gateway device 160 can receive the frames of multimedia data from the server 140. The gateway device 160 and the server 140 can be directly connected, or can be connected over a network, e.g., the network 110. The gateway device 160 can be implemented in hardware and configured to operate a software program. For example, the gateway device 160 can be implemented in hardware and programmed to receive, store, process and transmit data over one or more networks. In some implementations, the gateway device 160 can reside within the server 140. For example, the gateway device 160 can be implemented as a Flash Media Gateway within the Flash Media Server® by Adobe Systems Incorporated of San Jose, Calif. In some other implementations, the gateway device 160 can be any application, module or device, implemented in software that can receive, store, process and transmit data over one or more networks. The gateway device 160 can process the stored frames of multimedia data to generate packets of multimedia data. The gateway device 160 can transmit the packets of multimedia data over the network 120. For example, the gateway device 160 can transmit the voice information encoded into packets of multimedia data as a real-time audio stream over the network 120.

Figure 2:
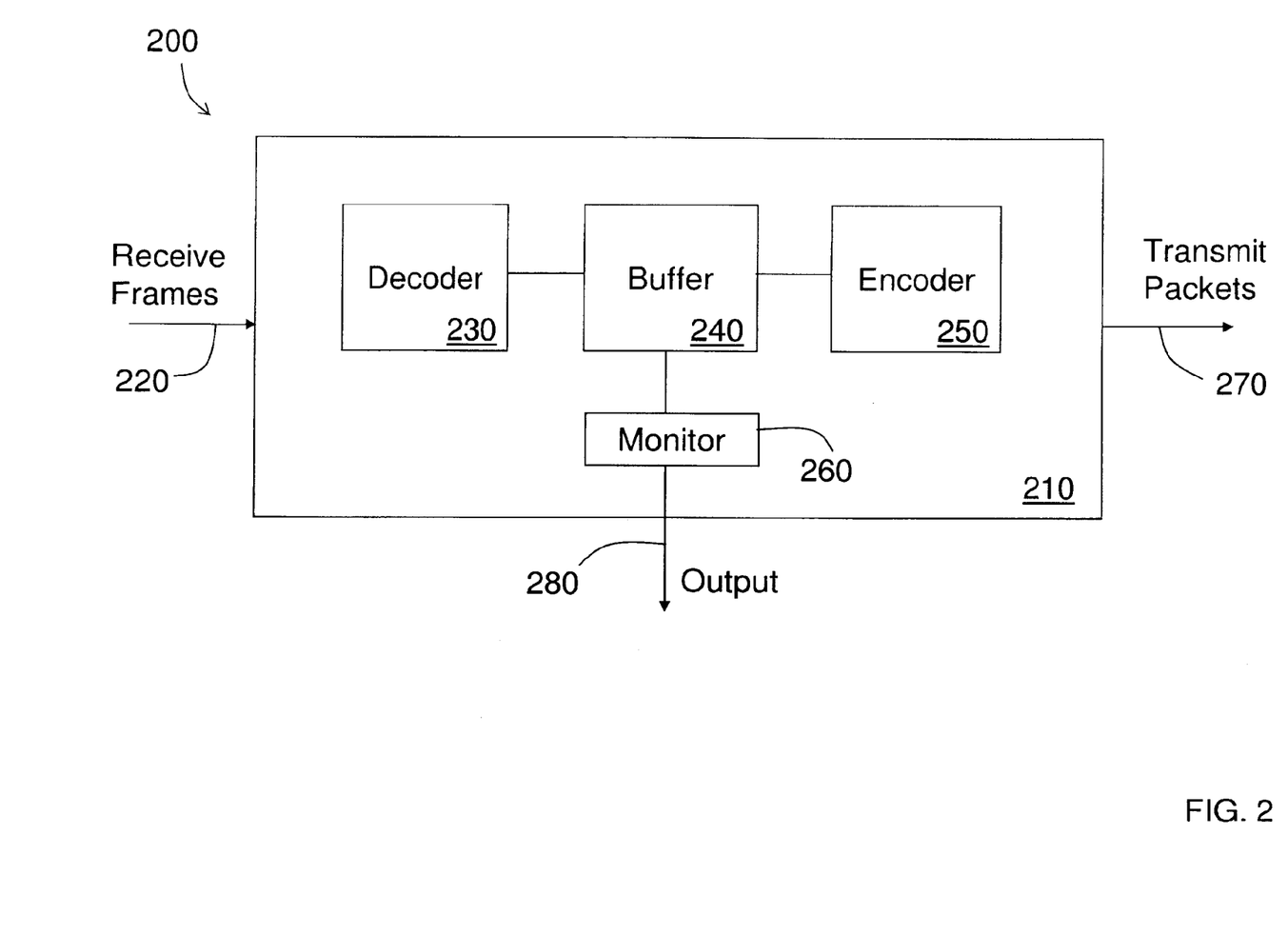
FIG. 2 shows an example of a data processing system at a gateway device.

FIG. 2 shows an example of a data processing system 200 at a gateway device 210. The gateway device 210 can be implemented to determine a level of delay during the processing of digital data. More specifically, the gateway device 210 can be configured to manage and reduce the level of delay at a buffer 240 during the retrieval and encoding of the stored frames of multimedia data.

The gateway device 210 can receive the frames of multimedia data 220. In some implementations, the gateway device 210 can receive the frames of multimedia data over a network using TCP. In some implementations, the frames of multimedia data can be received as a real-time audio stream from a server. The frames of multimedia data can be received (220) in a consistent stream with a consistent flow rate, or in variable-sized bursts, depending on how the data is transmitted from the server, or on the prevailing conditions of the network. The frames of multimedia data can be transmitted over the network using the Real Time Messaging Protocol ("RTMP"). The RTMP is a protocol developed by Adobe Systems Incorporated of San Jose, Calif. for streaming audio, video and data over the Internet. For example, the RTMP can enable real-time communication between a Flash Media Player® and a Flash Media Server®, or a Flash Media Server® and a Flash Media Gateway.

The received frames of multimedia data (220) can be decoded by a decoder 230 residing within the gateway device 210. The decoder 230 can be implemented as an electronic device and configured to operate a software program. For example, the decoder 230 can be implemented in hardware and programmed to convert data, such as a telecommunication signal, from its transmitted form into a form interpretable to other electronic devices. In some implementations, the decoder 230 can be any application, module or device, implemented in software that can convert data from its transmitted form into a form interpretable to other devices. Thus, the decoder 230 can be implemented to undo the received and encoded frames of multimedia data in order to obtain original information. For example, the decoder 230 can decode the digital audio signals to obtain the underlying voice information. The decoded frames of multimedia data can be stored in the buffer 240.

The buffer 240 can be implemented as a continuous array of data in memory used to temporarily store the decoded frames of multimedia data between processes within the gateway device 210. The buffer 240 can be implemented in hardware and configured to operate a software program. In some implementations, the buffer 240 can be any application, module or device, implemented in software. The buffer 240 can be implemented as a circular buffer (or ring buffer), linked list, or a first-in-first-out ("FIFO") queue data structure. In a FIFO queue data structure, the first data to be added to the queue will be the first data to be removed from the queue. The buffer 240 can hold the decoded frames of multimedia data until the data is retrieved for encoding at an encoder 250.

The encoder 250 can retrieve the stored frames of multimedia data from the buffer 240. The encoder 250 can be implemented as an electronic device and configured to operate a software program. For example, the encoder 250 can be implemented in hardware and programmed to convert data from its received form into a form interpretable to other devices. In some implementations, the encoder 250 can be any application, module or device, implemented in software that can convert data from its received form into a form interpretable to other devices. The encoder 250 can be implemented to compress data during encoding for transmission. In some implementations, the decoder 230 and encoder 250 can be implemented as a transcoder for direct digital-to-digital conversion of one encoding to another. The encoder 250 can be implemented to encode the stored frames of multimedia data to generate packets of multimedia data. In some implementations, the packets of multimedia data can be transmitted 270 from the gateway device 210 over a network using UDP to a requesting device, a receiving device, or both. The requesting or receiving device can be implemented as a Real-time Transport Protocol ("RTP") or Session Initiation Protocol ("SIP") client. The RTP/SIP protocols can be used in streaming multimedia communication systems, such as in VoIP systems.

A monitor 260, in communication with the buffer 240, can be implemented to determine the level of delay at the buffer 240. The monitor 260 can be implemented as an electronic device and configured to operate a software program. For example, the monitor 260 can be implemented in hardware and programmed to determine a level of persistent delay at the buffer 240. In some implementations, the monitor 260 can be any application, module or device, implemented in software that can be configured to determine a level of persistent delay at the buffer 240. The monitor 260 can monitor the buffer 240 over a configurable time interval. During the configurable time interval, the level of persistent delay at the buffer 240 can be determined by taking the difference between a determined minimum length of data in the buffer and a threshold length of data in the buffer. The determined minimum length of data in the buffer 240 is defined as the smallest amount of data in the buffer 240 during the configurable time interval. The threshold length of data in the buffer 240 is defined as a configurable maximum length of data in the buffer 240 that will not cause persistent delay during buffering. Based on the monitoring of the buffer 240, an output 280 can be provided to cause a reduction in the level of delay during the retrieval and encoding of the stored frames of multimedia data. In some implementations, the reduction in the level of delay can include re-sampling the stored frames of multimedia data during the encoding.

In some other implementations, the reduction in the level of delay can include dropping one or more of the stored frames of multimedia data during the encoding. For example, silent frames of data that are received over the network before a variable-sized burst of data is received can be dropped. The gateway device 210 also can be implemented to receive a special audio message of length zero which denotes the start of silence during a conversation over the network. Upon receiving a silence message, the gateway device 210 can notify the requesting device, e.g., a subscribing client, that there will not be any incoming audio data for a specified, or unspecified, duration because the transmitting device, e.g., a publisher, has stopped sending audio data. Also, when the silence message is received, the monitor 260 can provide an output 280 to cause the silent frames of multimedia data to be dropped during processing. Additionally, the encoder 250 can use this information to decrease or stop the external delay catch-up process.

Figure 3A:
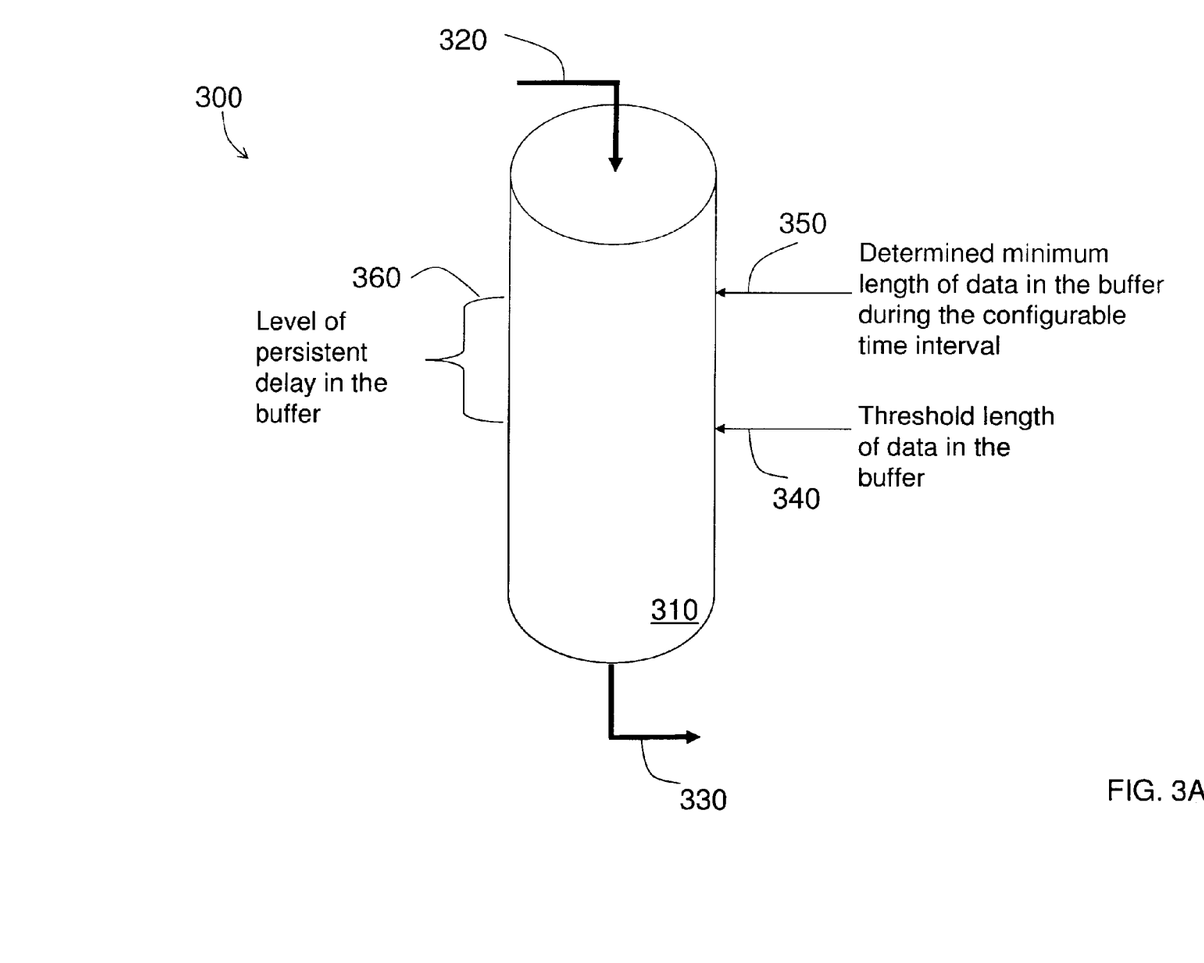
FIG. 3A shows an example of monitoring a buffer to determine a level of persistent delay.

FIG. 3A shows an example of monitoring a buffer to determine a level of persistent delay (300). Decoded frames of multimedia data can be input 320 into the buffer 310. The decoded frames of multimedia data also can be output 330 from the buffer 310. The buffer 310 can be implemented as a FIFO data structure, such that the first frames of multimedia data input 320 into the buffer 310 are the first frames of multimedia data output 330 from the buffer 310. The frames of multimedia data need not be contiguous, and therefore, the buffer 310 can be implemented as a queue. The buffer 310 also can be implemented as a ring buffer or linked list data structure. The decoded frames of multimedia data can be stored in the buffer 310 prior to being retrieved and encoded. The buffer 310 can be monitored over a configurable interval to determine the level of persistent delay 360 during the retrieval and encoding of the stored frames of multimedia data. The configurable interval can be measured in a number of audio frames, a duration in milliseconds, or both.

The level of persistent delay 360 at the buffer 310 can be determined based on the difference between a determined minimum length of data 350 in the buffer 310 during the configurable time interval and a threshold length of data 340 in the buffer 310. The threshold length of data 340 can be configurable and set to any value less than the total length of the buffer 310. The length of data in the buffer 310 can be monitored to determine the minimum length of data 350 in the buffer 310 over the configurable time interval. If the determined minimum length of data 350 in the buffer 310 exceeds the threshold length of data 340 in the buffer 310, then a level of persistent delay 360 is determined to be present during the retrieval and encoding of the stored frames of multimedia data. The level of persistent delay 360 can be caused by excessive buffering during the configurable time interval. Excessive buffering generally corresponds to more than the required buffering to ensure smooth playback, e.g., audio playback, of the multimedia data. The level of persistent delay 360 can be reduced by dropping one or more of the stored frames of multimedia data, or by re-sampling the stored frames of multimedia data to compress the amount of data to be retrieved and encoded. If the determined value of persistent delay during a previous monitoring interval is less than the threshold length of data 340 in the buffer 310, the external catch-up logic, i.e., dropping data, re-sampling data, or both, can be disabled.

Figure 3B:
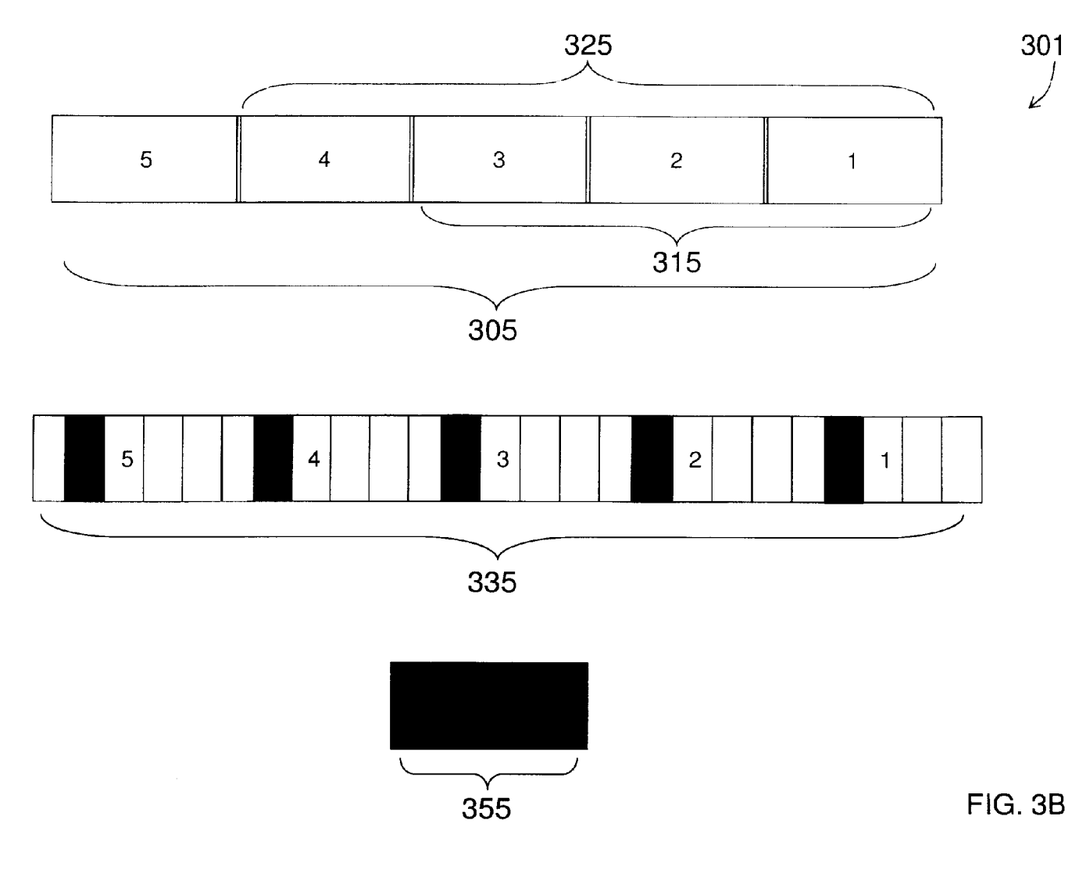
FIG. 3B shows an example of re-sampling frames of multimedia data at a buffer.

FIG. 3B shows an example of re-sampling stored frames of multimedia data (301). Re-sampling the stored frames of multimedia data (301) reduces the amount of data that needs to be retrieved and encoded. Reducing the amount of data that needs to be retrieved and encoded can eliminate excessive buffering which can adversely affect the smooth playback of the multimedia data. In some implementations, the external catch-up logic can commence upon one or more frames of multimedia data being output from a buffer 305. Because the buffer 305 can retain its FIFO implementation, the one or more frames of multimedia data being output from the buffer 305 also can be the first one or more frames of multimedia data input into the buffer 305.

For example, five frames of multimedia data, i.e., frames 1-5, can be stored in the buffer 305. Thus, the buffer 305 has a total length of five frames of multimedia data. The buffer 305 can be configured such that the threshold length of data 315 in the buffer 305 is three frames of multimedia data, i.e., frames 1-3. Based on the monitoring of the buffer 305 over a configurable interval, the minimum length of data 325 in the buffer 305 can be determined to be four frames of multimedia data. Because the minimum length of data 325 in the buffer 305 exceeds the threshold length of data 315 in the buffer 305, persistent delay is present in the processing of the stored frames of multimedia data. To reduce the level of persistent delay during the retrieval and encoding of the stored frames of multimedia data, the stored frames of multimedia data can be re-sampled. Re-sampling can include the digital process of changing the sample rate or dimensions of digital imagery or audio by temporally or a really analyzing and sampling the original data. Audio re-sampling (or sample rate conversion) can include converting a sampled digital signal from one sampling frequency to another.

Re-sampling can occur when the frames of multimedia data are output from the buffer 305. For example, when the first frame, i.e., frame 1, is output from the buffer 305, the first frame can be re-sampled, i.e., de-sampled, into five discrete samples of data. The other frames, i.e., frames 2-5, also can be re-sampled into five discrete samples of data as they are output from the buffer 305. The encoding process can be implemented to retrieve the second of the five discrete sample of data 335, i.e., samples a-e, from each of the five frames of multimedia data. The samples a-e can be representative of the data contained within the five frames of multimedia data, i.e., frames 1-5, respectively. The samples a-e can be combined 355 and encoded to generate one or more packets of multimedia data. The one or more packets of multimedia data can be transmitted over a network to a requesting device.

In some implementations, frames of multimedia data can be dropped during the retrieval process. Frames having a low level of activity can be dropped to reduce the level of persistent delay at the buffer 305. In some implementations, to achieve the desired buffer 305 catch-up, frames having the lowest level of activity, i.e., the least amount of data, can be dropped first, before frames are re-sampled. When dropping frames alone does not achieve the desired buffer 305 catch-up, the external catch-up logic can be implemented to drop frames and re-sample frames concurrently.

Figure 4:
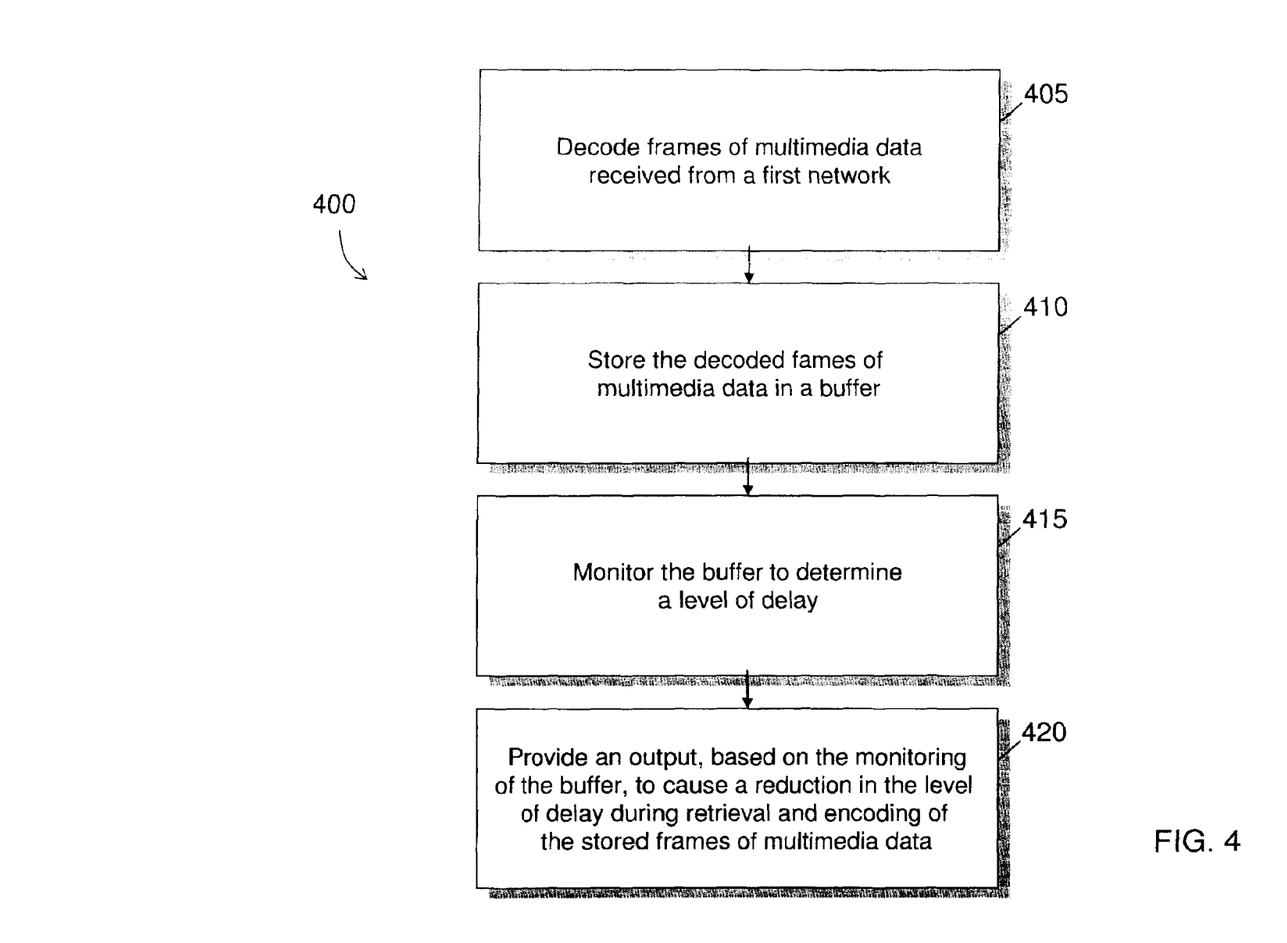
FIG. 4 shows a flowchart of an example process for causing a reduction in the level of delay in a buffer.

FIG. 4 shows a flowchart of an example process 400 for causing a reduction in the level of delay in a buffer. The process 400 can, for example, be implemented in the communication system 100 depicted in FIG. 1 and the data processing system 200 at the gateway device 210 in FIG. 2.

Frames of multimedia data received from a first network can be decoded (405). The frames of multimedia data can include audio content, video content or both. The first network can transmit the frames of multimedia data using TCP. In some implementations, the frames of multimedia data can be decoded at a gateway device including a decoder or a transcoder. In some other implementations, the frames of multimedia data received from the first network can be encoded and can remain encoded.

The decoded frames of multimedia data can be stored in a buffer (410). The buffer can be implemented as a region of memory within a gateway device used to temporarily hold the decoded frames of multimedia data. The decoded frames of multimedia data can include the original voice information that was encoded into the digital audio signals and transmitted as frames of multimedia data. In some implementations, encoded frames of multimedia data can be stored in the buffer.

The buffer can be monitored to determine a level of delay (415). The buffer can be monitored by a monitoring device. The monitoring device can reside external to, or within the gateway device. The level of delay can include the state of the queue at the buffer.

An output, based on the monitoring of the buffer, can be provided to cause a reduction in the level of delay during retrieval and encoding of the stored frames of multimedia data (420). The stored frames of multimedia data can be retrieved from the buffer by an encoder or a transcoder. In some implementations, the output can be configured to encode the frames of multimedia data. The stored frames of multimedia data can be encoded to generate packets of multimedia data. The output can be transmitted to a device external to, or within the gateway device. For example, the output can be transmitted to a device pulling the data from the buffer. The reduction in the level of delay can include re-sampling the stored frames of multimedia data during the encoding. The packets of multimedia data can be transmitted over a second network. The second network can transmit the packets of multimedia data using UDP.

Figure 5:
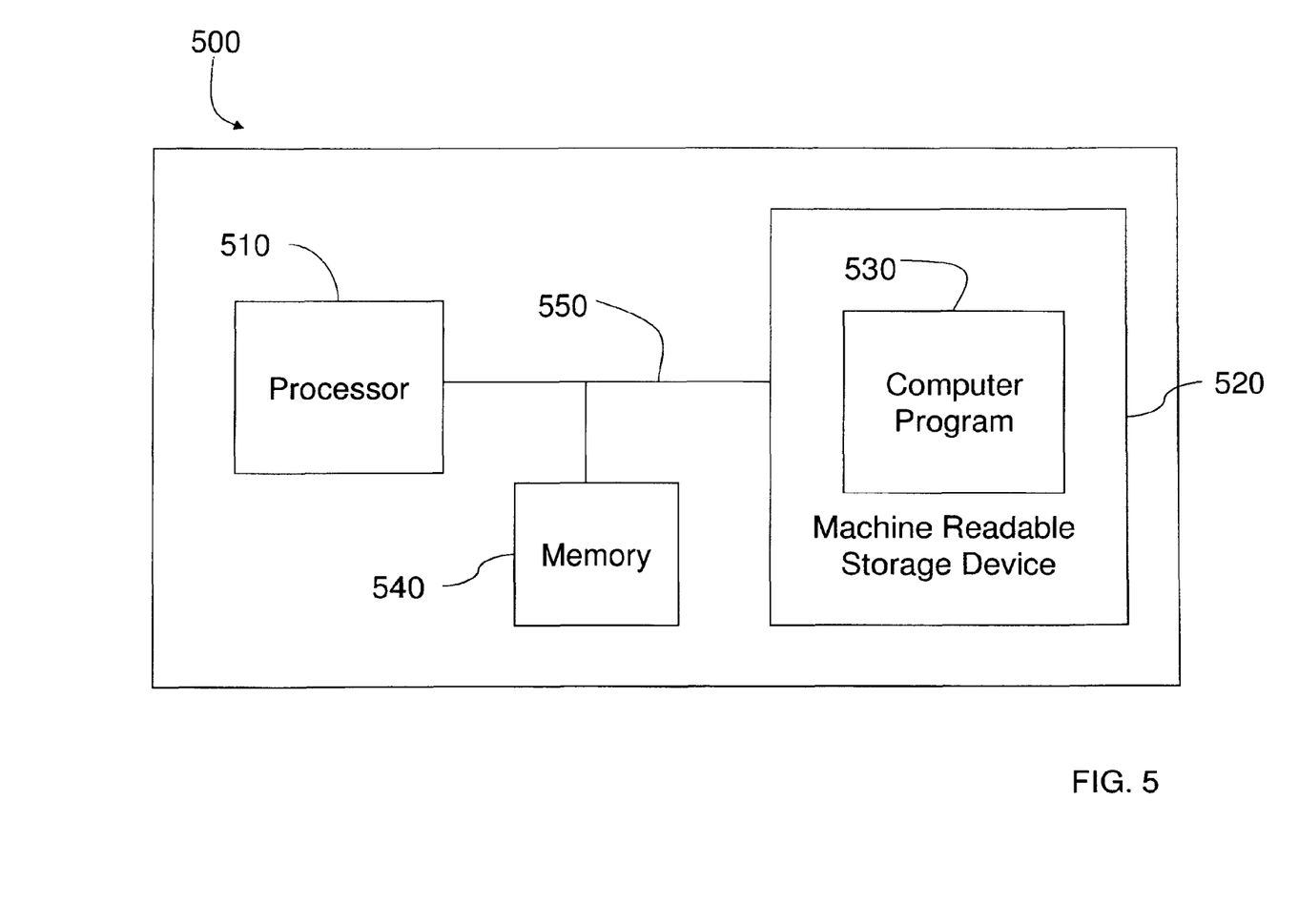
FIG. 5 shows a schematic diagram of an example computer system that can be utilized to implement the systems and methods described herein.

FIG. 5 shows a schematic diagram of an example computer system 500 that can be utilized to implement the systems and methods described herein. The system 500 includes a processor 510, a machine-readable storage device 520, a computer program 530, and a memory 540. Each of the components 510, 520, 530, and 540 can, for example, be interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 540 or on the machine-readable storage device 520.

The memory 540 stores information within the system 500. In some implementations, the memory 540 is a volatile memory unit. In some implementations, the memory 540 is a non-volatile memory unit. The machine-readable storage device 520 is capable of providing mass storage for the system 500. In various implementations, the machine-readable storage device 520 can, for example, include a hard disk device, an optical disk device, or some other large capacity storage device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage media for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be, or be included in, a computer-readable storage device, a computer-readable storage substrate, a random or serial access memory array or device, or a combination of one or more of them.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN"), a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
    decoding frames of multimedia data received from a first network;
    storing the decoded frames of multimedia data in a buffer;
    monitoring the buffer to determine a level of delay over a configurable time interval;
    determining a minimum length of the buffer during the configurable time interval;
    providing an output, based on the monitoring of the buffer, to cause a reduction in the level of delay during retrieval and encoding of the stored frames of multimedia data; and
    providing an indication of the level of delay based on a difference between the determined minimum length and a threshold length.

2. The method of claim 1, further comprising:
    performing the encoding to generate packets of multimedia data; and
    transmitting the packets over a second network.

3. The method of claim 2, wherein performing the encoding comprises resampling the stored frames of multimedia data.

4. The method of claim 2, wherein the frames of multimedia data are received using transmission control protocol (TCP) and the packets are transmitted using user datagram protocol (UDP).

5. A computer storage medium encoded with a computer program, the program comprising instructions that when executed by data processing apparatus cause the data processing apparatus to perform operations comprising:
    decoding frames of multimedia data received from a first network;
    storing the decoded frames of multimedia data in a buffer;
    monitoring the buffer to determine a level of delay over a configurable time interval;
    determining a minimum length of the buffer during the configurable time interval;

providing an output, based on the monitoring of the buffer, to cause a reduction in the level of delay during retrieval and encoding of the stored frames of multimedia data; and providing an indication of the level of delay based on a difference between the determined minimum length and a threshold length.

6. The computer storage medium encoded with a computer program of claim 5, wherein the operations further comprise:

performing the encoding to generate packets of multimedia data; and transmitting the packets over a second network.

7. The computer storage medium encoded with a computer program of claim 6, wherein performing the encoding comprises re-sampling the stored frames of multimedia data.

8. The computer storage medium encoded with a computer program of claim 6, wherein the frames of multimedia data are received using transmission control protocol (TCP) and the packets are transmitted using user datagram protocol (UDP).

9. A system comprising:

a server that receives and stores frames of multimedia data;

a requesting device, in communication with the server, that requests the frames of multimedia data; and a gateway device, in communication with the server and the requesting device, configured to perform operations comprising:

decoding the frames of multimedia data received over a first network;

storing the decoded frames of multimedia data in a buffer;

monitoring the buffer to determine a level of delay over a configurable time interval;

determining a minimum length of the buffer during the configurable time interval;

providing an output, based on the monitoring of the buffer, to cause a reduction in the level of delay during retrieval and encoding of the stored frames of multimedia data; and providing an indication of the level of delay based on a difference between the determined minimum length and a threshold length.

10. The system of claim 9, wherein the operations further comprise:

performing the encoding to generate packets of multimedia data; and transmitting the packets over a second network.

11. The system of claim 10, wherein performing the encoding comprises resampling the stored frames of multimedia data.

12. The system of claim 10, wherein the frames of multimedia data are received using transmission control protocol (TCP) and the packets are transmitted using user datagram protocol (UDP).

13. The method of claim 1, wherein the frames of multimedia data correspond to at least one of an audio clip or a video clip.

14. The method of claim 1, wherein the threshold length is configurable to a value that is less than a total length of the buffer.

15. The computer storage medium encoded with a computer program of claim 5, wherein the frames of multimedia data correspond to at least one of an audio clip or a video clip.

16. The computer storage medium encoded with a computer program of claim 5, wherein the threshold length is configurable to a value that is less than a total length of the buffer.

17. The system of claim 9, wherein the frames of multimedia data correspond to at least one of an audio clip or a video clip.

18. The system of claim 9, wherein the threshold length is configurable to a value that is less than a total length of the buffer.

* * * * *